United States Patent

Spangemacher

[15] 3,635,042
[45] Jan. 18, 1972

[54] METHOD AND APPARATUS FOR WITHDRAWING HEAT FROM INDUSTRIAL PLANTS, ESPECIALLY POWER PLANTS

[72] Inventor: Kurt Spangemacher, Bochum, Germany
[73] Assignee: Maschinenbau-Aktiengesellschaft Balcke, Bochum, Germany
[22] Filed: Oct. 29, 1969
[21] Appl. No.: 872,161

[30] Foreign Application Priority Data

Nov. 2, 1968 Germany ..................... P 18 06 656.3

[52] U.S. Cl. .......................... 62/121, 62/91, 62/122, 62/304, 62/305, 62/310, 62/314, 261/150
[51] Int. Cl. .................................................. F28c 1/00
[58] Field of Search ............... 62/91, 121, 122, 304, 305, 62/310, 314; 261/DIG. 11, 151; 165/60

[56] References Cited

UNITED STATES PATENTS

| | | | |
|---|---|---|---|
| 2,071,509 | 2/1937 | Dudley | 62/310 |
| 2,185,964 | 1/1940 | Larrecq | 62/314 |
| 2,214,880 | 9/1940 | Crawford | 62/310 |
| 2,718,766 | 9/1955 | Imperatore | 62/305 |
| 2,732,192 | 1/1956 | Johnson | 62/121 |
| 2,858,677 | 11/1958 | Stone | 62/310 |
| 3,116,612 | 1/1964 | Pennington | 62/310 |
| 3,360,906 | 1/1968 | Parkinson | 55/257 |
| 3,519,068 | 7/1970 | Harris | 165/68 |

*Primary Examiner*—William J. Wye
*Attorney*—Walter Becker

[57] ABSTRACT

A method of and apparatus for withdrawing waste heat from industrial plants, especially power plants, preferably for condensing turbine steam, by cooling the steam or water by wet and dry cooling tower means, according to which the waste heat is conveyed to the cooling air of a cooling tower structure having a wet cooling tower component, preferably of annular shape and to a dry cooling tower component above and in close relationship to said dry cooling tower component and preferably likewise of annular shape, the cooling air for said two cooling tower components being respectively supplied thereto separately from each other, whereas the heated up cooling air is withdrawn in common from said two cooling tower components.

9 Claims, 3 Drawing Figures

METHOD AND APPARATUS FOR WITHDRAWING HEAT FROM INDUSTRIAL PLANTS, ESPECIALLY POWER PLANTS

The present invention relates to a method of and apparatus for withdrawing heat from industrial installations, especially power plants. For withdrawing the heat developed in industrial installations, it is known to use water as cooling means and to take the water from wells or rivers. This practice decreases more and more in importance because most springs and rivers are practically exhausted as far as this purpose is concerned. In many instances also cooling towers are employed in which the water trickling down is cooled by atmospheric air. In view of the direct contact of the water with the air, evaporation and consequently water losses occur which have to be made up by additional water. For purposes of avoiding water losses, it is known to pass the medium to be cooled, for instance, through pipes the walls of which are cooled by atmospheric air. Such dry cooling towers are expensive and require a relatively large number of elements. The question whether with a new installation wet or dry cooling towers are to be employed depends to a great extent on the price for the additional water when using a wet cooling tower as compared to the higher capital investment when using air condensation.

The invention is based on the fact that the waste heat of many industrial installations is not obtained uniformly. In particular, with power plants the heat discharge depends on the daily and seasonal consumption of the electric network. Many schedules of power plants operate temporarily with a load which is considerably below the full load.

It is an object of the present invention so to design an industrial installation, especially power plant at the cold end (im kalten Ende) that for the base load there is employed a dry cooling tower whereas the peak load is absorbed by a wet cooling tower. In this way the higher installation costs are incurred only for the base load part whereas the costs for the additional water consumption of the wet cooling tower are incurred only during the peak periods.

With air condensation installations it is known temporarily to inject water into the cooling air in order to reduce the temperature of the cooling air. This is done, for instance, through nozzles similar to air-conditioning installations.

According to another heretofore known method, the cooling air is passed through an antichamber in which similar to a wet cooling tower water trickles downwardly while the air is nearly saturated with water steam. Such an installation is intended at low outer air temperatures to work as a pure air-cooled heat exchanger whereas at higher outer air temperatures and a lower air humidity, additionally a larger or smaller quantity of water is injected in order to reduce the temperature of the cooling air to a corresponding extent.

In contradistinction to the above, the present invention provides to withdraw the waste heat of industrial installations, especially of power plants, in an arrangement in which a dry cooling tower and a wet cooling tower are combined with each other.

The invention is illustrated by way of example in the accompanying drawings, in which:

FIG. 1 diagrammatically illustrates an installation according to the invention in which the turbine waste steam is condensed partly in a water cooled and partly in an air-cooled condenser.

Figure 1:
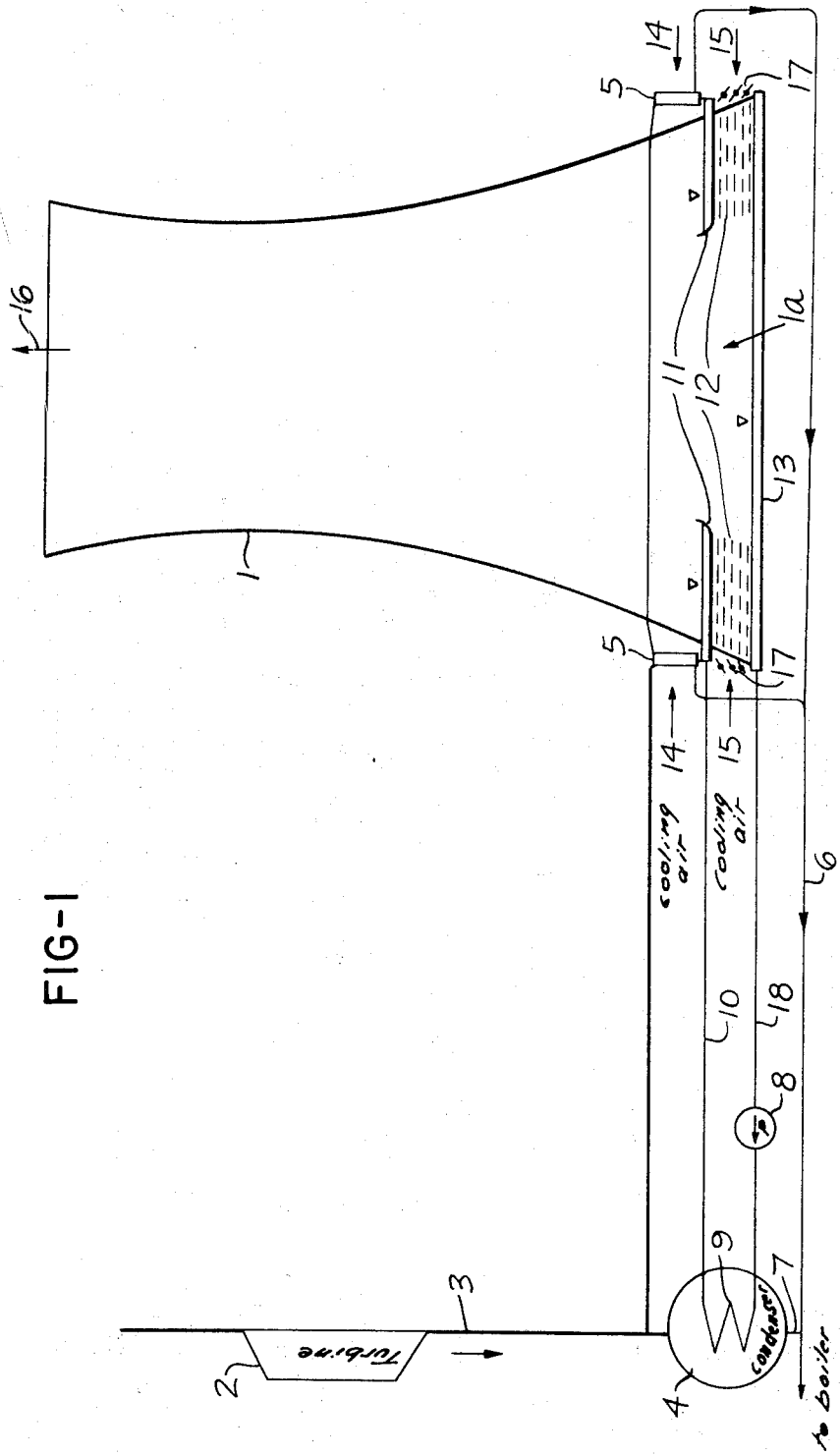

The present invention takes into consideration that the different characteristics of water condensation with a wet cooling tower and a dry cooling tower supplement each other inasmuch as the wet cooling tower in summer mitigates the undesired temperature peak of the dry cooling tower whereas in winter the nonexploitable temperature drop of the dry cooling tower is compensated for by a correspondingly high load. A coarse calculation shows that when at a mean annual temperature of $+10°$ C. ($t_f=8°$ C.) the water condensation with wet cooling tower and dry cooling tower each are supposed to withdraw half of the heat at the same vacuum, at $-10°$ C. the air-cooled heat exchanger would be in a position to condense approximately 75 percent so that only 25 percent would remain for the cooling by the wet cooling tower. In summer, at a temperature of $-25°$ C. ($t_f=19°$ C.), the wet cooling tower could then take over 65 percent of the cooling work and the dry cooling tower could take over 35 percent. The condensation temperature could in this connection be improved by approximately $6°$ C. with regard to a pure condensation by a dry cooling tower. This amounts to an increase in the turbine output at the same heat consumption of 2 percent with regard to an installation with pure dry cooling tower condensation. The drawback of the condensation by dry cooling towers which drawback consists in the considerable output drop of the output of the power plant at high summer temperatures, would be reduced as if the dry cooling tower had been provided with air humidification. A combined installation—water condensation with wet cooling tower and dry cooling tower—is thus also superior to the above-mentioned pure condensation in a dry cooling tower with water injection into the air inasmuch as a combined installation according to the invention will also during summertime not require more additional water than the last-mentioned installation, whereas the installation costs are considerably lower.

With a combined installation according to the present invention the additional water consumption will at full load amount to:

at $-10°$ C. 25 percent of the cooling with pure wet cooling tower, at $+10°$ C. 50 percent of the cooling with pure wet cooling tower, at $+25°$ C. 65 percent of the cooling with pure wet cooling tower.

Since, however, heat power plants seldom operate at full load, but follow a schedule which provides for short full load peaks, the consumption of additional water will be considerably less inasmuch as during partial load the dry cooling tower is fully used and the wet cooling load may be reduced correspondingly further. With a combination according to the present invention, thus the dry cooling tower would so to speak take over the base load and the wet cooling condensation would take over the peak. The advantage of the condensation with dry cooling towers, namely not to require any additional water, is thus also present for the great part of the work performed by the power plant. The advantage of the wet cooling tower, namely low installation costs, applies for the peak output.

With a method for withdrawing the waste heat from industrial plants, especially power plants, preferably for condensing turbine exhaust steam by cooling the steam or the water while employing wet-dry cooling towers, the invention is seen in the fact that the waste heat of a signal process is in a combined wet-dry cooling tower conveyed to the cooling air while the cooling air for the dry cooling part is introduced in parallel to and separate from the cooling air for the wet cooling tower part and is withdrawn together.

According to one embodiment of the invention, a portion of the steam to be cooled is in a manner known per se condensed in a condenser, and the cooling water of the condenser is passed in a circuit through the wet cooling part, whereas the other part of the steam is conveyed to the dry cooling power part.

According to another embodiment of the invention, the steam to be cooled is condensed in a combined injection pipe condenser in which the cooling water flowing in the pipes is in a circuit for cooling purposes passed over the wet cooling tower part. The injection cooling water of said injection pipe condenser which injection cooling water leaves the condenser together with the condensate and subsequently is separated therefrom, is passed through the dry cooling tower part and after having been cooled is again injected into the condenser.

According to the present invention, it is furthermore provided that the steam to be cooled is condensed in a condenser and that the cooling water in the circuit successively passes through the dry cooling tower part and the wet cooling tower part.

The control of the process is in conformity with the invention effected in such a way that by means of throttling flaps or louvers at the circumference of the wet cooling tower part the wet cooling tower part more or less takes part in the withdrawal of the process.

Referring now to the drawings in detail and FIG. 1 thereof in particular, the arrangement shown therein comprises a combined wet-dry cooling tower 1. Instead of a self-venting cooling tower with a high smokestack, also a low cooling tower of any standard design may be employed with one or more ventilators. The wet cooling tower part 1a is in the form of a ring arranged on the base surface of the tower and comprises the collecting through 11, the sprinkling part 12 and the cooling tower pan 13. The water to be cooled passes from the collecting trough 11 through nonillustrated spray pipes or nozzles into the sprinkling part 12 in which it trickles downwardly in a free distribution and is cooled by the air. This cooling air is drawn in by the smokestack effect or by ventilators laterally at the circumference in the direction of the arrow 15. In front of the air entrance into the wet cooling part there are provided adjustable throttle flaps or louvers 17 by means of which the quantity of entering air can be controlled. The cooled water is collected in the cooling tower pan 13. Above the wet cooling tower part and over the entire circumference of the dry cooling tower part there extends an air-cooled surface condenser which may be of any standard design. The cooling air strikes the surface condenser in the direction of the arrow 14. The waste air is withdrawn by the smokestack and leaves the same together with the air rising from the wet cooling tower part through the outlet 16.

With the embodiment illustrated in FIG. 1, a part of the waste steam is conveyed to the condenser 4 through the conduit 3 while the other part of the waste steam is conveyed to the dry cooling tower part 5. The condensate of the two condensers passes through conduit 6, 7 back to the boiler. The water which flows through the cooling pipes 9 of the condenser 4 is by means of the pump 8 conveyed to the collecting trough 11 through a conduit 10, and is then cooled in the wet cooling tower part whereupon in a circuit it returns to the cooling pipes 9 of the condenser 4 through pipe 18.

Figure 2:
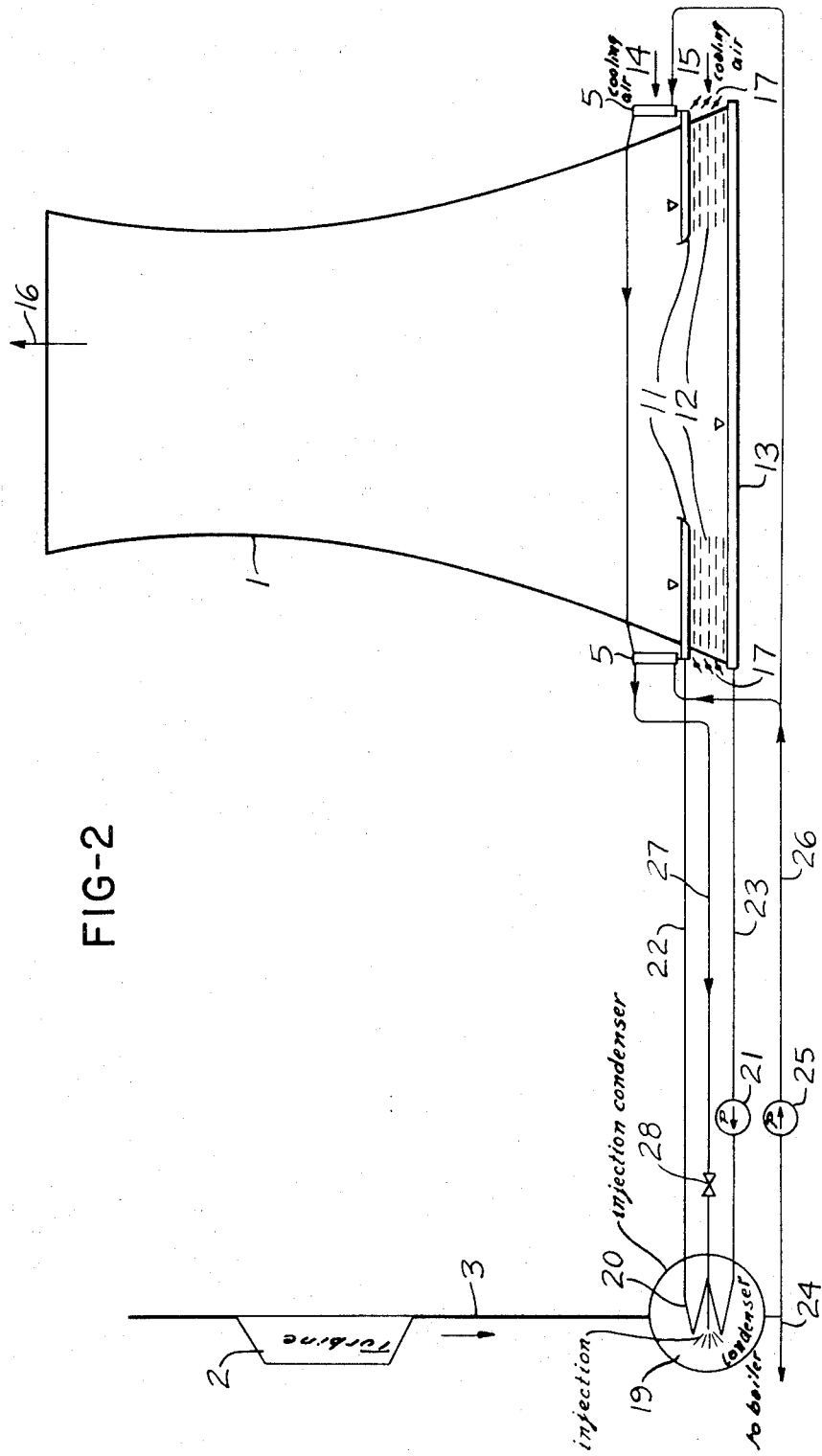
FIG. 2 shows an installation in which the turbine waste steam is condensed in a combined injection surface condenser.

With the embodiment according to FIG. 2, the waste steam of the turbine 2 passes through the waste steam line 3 into a combined injection surface condenser 19. Here the waste steam is condensed partly by the water-cooled pipe 20 and partly by injection water of the quality of the boiler fed water. The first cooling water circuit contains nondegasified and as a rule nondesalted water which is fed by the pump 21 through the cooling pipes 20 and the line 22 to the wet cooling tower part 1a which latter comprises the collecting trough 11, the sprinkling part 12 and the cooling tower pan 13. From here the water passes through line 23 back to the pump 21. The second circuit of the quality of the boiler fed water is withdrawn by pump 25 from the condenser 19 after branching off the condensate which is again fed to the boiler. The water withdrawn by the pump 25 is then conveyed through line 26 to the dry cooling tower part 5 which latter as a rule comprises fin-equipped heat exchanger pipes. In this dry cooling tower part 5, the water is recooled by cooling air which enters in the direction of the arrow 14. The cooled water passes through line 27 and a throttling member 28 which latter may, for instance, be an expansion turbine, to the condenser 19 of FIG. 2 through nonillustrated injection nozzles. The cooling air enters the combined cooling tower at the periphery of the wet cooling tower part (arrow 15) and the dry cooling tower part (arrow 14) and leaves the installation through the air outlet 16.

Figure 3:
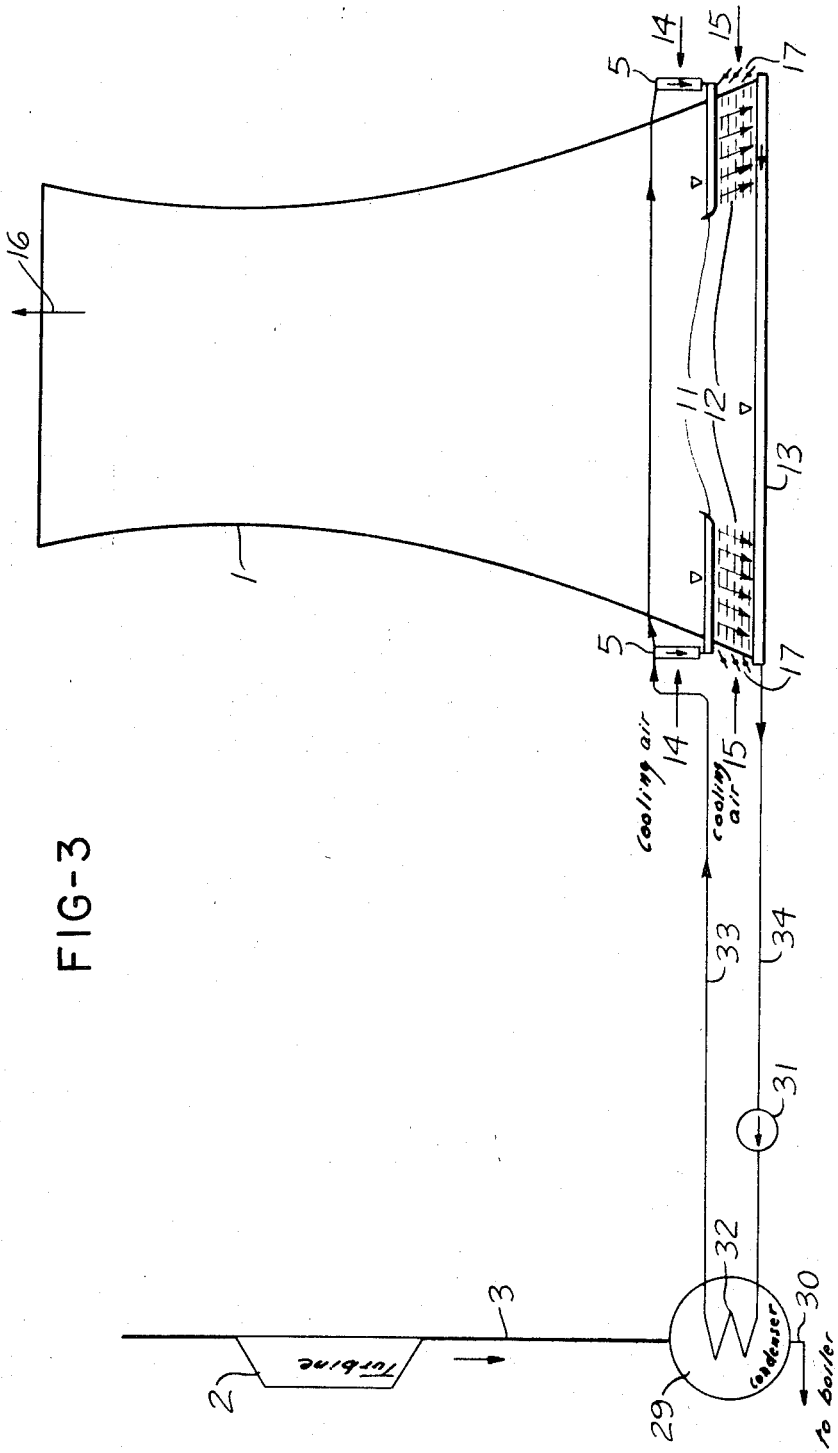
FIG. 3 shows an installation in which the turbine waste steam is condensed in a water-cooled condenser.

FIG. 3 shows an installation in which waste steam leaving the turbine 2 enters a water-cooled condenser 29 through a waste steam line 3 in the form of a condensate is returned through line 30 to the boiler. The cooling water is by pump 31 pressed through cooling pipes 32 of the condenser 29 and line 33 into the dry cooling tower part 5 and then passes into the collecting trough 11 of the wet cooling tower part. From here the water passes in the manner described in connection with FIG. 1 through the sprinkling part 12 into the cooling tower pan 13 from where it flows to the pump 31 through line 34. The cooling air passes through the combined wet-dry cooling tower in the manner described above and indicated by the arrows 14 and 15.

As will be evident from the above, the method according to the invention has numerous advantages, especially when the costs for the additional water are high, and the fuel costs, for instance when employing waste fuel material or nuclear energy, are low. The installation costs are under these circumstances approximately between those for the cooling with wet cooling towers and the cooling with dry cooling towers. The space required is less than with the cooling by dry cooling towers. The amount of additional water is only a fraction of the amount when working with pure wet cooling towers. In addition thereto, with the combination according to the present invention, there exists the possibility by a simple adjustment of the louvers to reduce the fuel costs at the expense of the additional water and vice versa. At low-power plant load, when the wet cooling part is completely turned off, the louvers are closed completely. Also at higher load the louvers are in most instances throttled, whereas at peak load the louvers are as a rule fully opened only in summer. The wet cooling part is particularly during the winter season, in view of its flat characteristics, able at fully opened louvers to take over such a load that the vacuum—of course at the expense of the consumption of additional water—will be improved. In this way it is possible not only to reduce the heat consumption but also to increase the power of the power plant. During the summer season, the wet cooling tower part may operate similar to the water injection into the air of dry cooling towers while the known drawbacks consisting in the deposit of salt on the cooling surfaces and the inherent corrosion will be avoided.

It is, of course, to be understood that the present invention is, by no means, limited to the particular showing in the drawings but also comprises any modifications within the scope of the appended claims.

What I claim is:

1. A method of withdrawing waste heat singularly from industrial plants, especially power plants, having combination cooling tower means with both a dry cooling tower component and also a wet cooling tower component, which includes the steps of: parallel feeding the cooling air to said dry cooling tower component and to said wet cooling tower component separately from each other while conveying heat derived from the waste heat of the respective plant to at least the cooling air of said dry cooling tower component, and withdrawing the heated air from both tower components together.

2. A method according to claim 1, which includes the step of controlling the parallel feeding for determining quantitative supply of cooling air of said wet cooling tower component in conformity with the desired cooling output of said wet cooling tower component.

3. A cooling tower structure for withdrawing waste heat from industrial plants, especially power plants, which include: combination cooling tower means with both a dry cooling tower component and also a wet cooling tower component paralleling each other, means for conveying heat derived from the waste heat of the respective plant to at least said dry cooling tower component, first cooling air-conveying means for conveying cooling air to said dry cooling tower component, second cooling air-conveying means for conveying cooling air to said wet cooling tower component, and air-withdrawing means common to said dry cooling tower component and said wet cooling tower component for withdrawing heated up cooling air therefrom.

4. A cooling tower structure according to claim 3, which includes control means associated with said second cooling air-conveying means for selectively varying the proportional participating effect of said wet cooling tower component in the total heat withdrawing process.

5. A cooling tower structure according to claim 4, in which said control means include louver means around wet cooling tower periphery.

6. A cooling tower structure according to claim 3, which includes cooling water operated condenser means having inlet means for connection to a waste steam supply from an industrial plant and being operable to condense received waste steam in part first conduit means forming a closed circuit and having interposed therein said condenser means and said wet cooling tower component for circulating cooling water for said condenser through the latter and said wet cooling tower component, and second conduit means including means for likewise receiving another part of waste heat containing steam and conveying the same to said dry cooling tower component.

7. A cooling tower structure according to claim 3, which includes a combined injection pipe line condenser provided with cooling means for water injection and with pipe lines for circulating cooling water and also with inlet means for connection with waste heat containing steam-conveying means, said pipe lines including means for circulating cooling water for said condenser progressively through said wet cooling tower component, and means for passing the injection cooling water for said condenser after it has been separated from the condensate in said condenser through said dry cooling tower component and subsequently back to said condenser for injection into the latter.

8. A cooling tower structure according to claim 3, which includes condenser means comprising pipe means for circulating cooling water therefor and being provided with inlet means for receiving waste heat containing steam to be condensed in said condenser, said pipe means including means for circulating said cooling water in a circuit from said condenser through said dry cooling tower component and said wet cooling tower component back to said condenser.

9. A cooling tower structure according to claim 3, in which said wet cooling tower component comprises sprinkling bed means and water distributing means and is provided with adjustable throttling means for controlling the cooling air before entering said wet cooling tower component, and in which said dry cooling tower component is arranged above said wet cooling tower component, said dry cooling tower component and said wet cooling tower component being of a substantially annular shape, and in which the air-withdrawing means are adapted to withdraw the heated up cooling air collectively and together from the central areas of both of said cooling tower compartments.

* * * * *